United States Patent [19]

Kalman

[11] Patent Number: 4,723,202
[45] Date of Patent: Feb. 2, 1988

[54] CONVERTER-FED AC MACHINE WITHOUT DAMPER WINDING

[75] Inventor: Gabor Kalman, Palos Verdes, Calif.

[73] Assignee: The Garrett Corporation, Los Angeles, Calif.

[21] Appl. No.: 34,260

[22] Filed: Apr. 2, 1987

[51] Int. Cl.⁴ .......................................... H02M 7/155
[52] U.S. Cl. .................................... 363/129; 318/138
[58] Field of Search ............. 363/126, 128, 129, 130, 363/138; 318/737, 800, 832, 138

[56] References Cited

U.S. PATENT DOCUMENTS

| | | |
|---|---|---|
| 3,392,319 | 7/1968 | McColl et al. . |
| 3,395,327 | 7/1968 | Kaiser et al. . |
| 3,450,983 | 6/1969 | Koppelmann et al. . |
| 3,725,768 | 4/1973 | Pelly . |
| 3,826,966 | 7/1974 | Nagasaka et al. . |
| 3,849,718 | 11/1974 | Forster et al. . |
| 3,983,469 | 9/1976 | Brown . |
| 4,039,926 | 8/1977 | Steigerwald . |
| 4,045,722 | 8/1977 | Tachibana . |
| 4,053,820 | 10/1977 | Peterson et al. . |
| 4,079,305 | 3/1978 | Peterson et al. . |
| 4,156,899 | 5/1979 | Matsuda et al. ...................... 363/138 |
| 4,445,081 | 4/1984 | Kalman et al. ................. 318/737 X |
| 4,476,424 | 10/1984 | Kalman ................................ 318/832 |

FOREIGN PATENT DOCUMENTS 1638645 1/1968 Fed. Rep. of Germany .

Primary Examiner—Peter S. Wong
Attorney, Agent, or Firm—David B. Abel; James W. McFarland

[57] ABSTRACT

A method and apparatus for converting the output of a polyphase AC machine into a DC current by capacitor assisted line commutation within the rectifying circuitry.

20 Claims, 11 Drawing Figures

CONVERTER-FED AC MACHINE WITHOUT DAMPER WINDING

BACKGROUND OF THE INVENTION

1. Field of the Invention.

This invention relates to AC machines with rectified output voltage and, more particularly, to rectifying circuitry incorporating capacitor-assisted line commutation to improve the rectified output voltage and the machine current waveform characteristics while eliminating the need for damper windings within the AC machines.

2. Description of the Prior Art.

Converter-fed AC machines operating in conjunction with line-commutated rectifiers or inverters generally require tertiary or damper windings in their rotating member to reduce the commutation reactance of the AC machine. Typically, the cost of such a damper winding ranges from 5% to 25% of the rotor fabrication expenses, depending upon the machine's size and type of construction.

In conventional converter-fed AC machines, damper windings have two main functions: (a) reduction of the commutation overlap (i.e., the time interval during which current transfers from one phase to the next) by decreasing the stored magnetic energy associated with the machine's leakage flux, and (b) absorption of the power associated with certain undesirable current harmonics which would, otherwise, be present in the machine's main winding. In view of the added cost and complexity resulting from the use of damper windings, it would be preferable to perform the above functions by an alternate means.

For a typical generator producing an AC voltage and current, a rectifier assembly is required to change the output of the generator to a DC voltage and current which is then applied to a load. The generator may, by way of example, include a rotatively driven rotor assembly and three sets of stator phase windings spaced around the rotor. As the rotor is rotatively driven, a sinusoidally varying voltage and corresponding current is induced within each stator phase winding. Since the phase windings are spaced about the rotating assembly, these sinusoidally varying voltages are 120° out of phase with one another for a three-phase arrangement. Similar symmetry conditions apply to an M-phase arrangement. The rectifier assembly with its six solid-state switches for a three-phase full-wave bridge connected arrangement functions to successively switch, in turn, each of the stator phase windings into electrical connection with the load.

The conducting paths, which embrace the AC sources, the loads, the interfaces, and the solid-state switches and their interconnections, invariably possess inductance. Thus for transfer of current, i.e. for commutation of current (or briefly: commutation) from one path to another to occur, in a finite time a potential of appropriate polarity must force the current in the path existing prior to commutation to zero and build the current in the incoming path to the appropriate level. Through the time interval, during which both the off-going and incoming switches are conducting, the AC machine is exposed to a momentary line-to-line short circuit, which reduces its recitifed output capability. The time interval is referred to as the commutation overlap. In the type of converters herein contemplated, under at least some operating conditions, the commutations are driven by the defined voltage source potentials of the AC generator, and occur when the next switch in sequence is closed without the help of external circuitry and requiring no additional solid state devices. These commutations are often called line commutations, natural commutations or load commutations. The generic term "line commutation" will be used here to delineate these communications. Similar names apply to the converters, e.g. we will refer to line-commutated converters.

When a source potential is not of the proper polarity to drive a source commutation, another potential must be introduced to effect the commutation desired within the converter. These potentials are typically developed by the action of a capacitor acting as a current source. This capacitor, and the associated extra switching components together are called the commutating circuit. Commutating circuits are parts of the switches, and not parts of the switching matrices of the converter logic circuit. Commutations effected by commutation circuits are generally termed forced commutations, and converters which rely wholly or largely thereon are said to be forced-commutated or self-commutated. Forced-commutated converters do not display overlap, but line-commutated converters require no extra commutative circuitry, and therefore are generally less complex than their forced-commutated counterparts.

It is therefore desirable to develop the combination of a line-commutated converter and an AC machine in which the need for a damper winding in the machine rotor is eliminated, and which additionally eliminates the deleterious effects of commutation overlap thereby reducing both the initial and the operating costs of the system incorporating the AC machine.

Special considerations apply in the use of generating systems for use on aircraft. The service requirements are generally more stringent and weight reduction is an important factor. Current practice utilizes a polyphase (typically three phase) AC generator in conjunction with line-commutated rectifiers for converting to a DC voltage output.

Whenever the output voltage of an aircraft generator is rectified, there is a significant voltage drop through the generator/rectifier unit. A part of this voltage drop is caused by the generator commutation reactance which prevents instantaneous current transfer, i.e., commutation, between rectifier branches. The main component of the commutation reactance is the generator leakage inductance. During commutation overlap, the generator terminals are subjected to line-to-line short-circuit (typically six times per cycle) which, in turn, reduces the output voltage by as much as 30%. In accordance with the present invention, static capacitors are connected to the AC terminals of the generator (built with or without damper windings) provide an alternate current path and thereby allowing current transfer from one phase to the next in sequence to be achieved instantaneously, thus substantially eliminating the commutation overlap and regaining the 30% drop in the output voltage.

Certain operating specifications require that aircraft generators be capable of handling 150% or higher rated load for several seconds. For such overload conditions, the size of the generator is dictated by the allowable rectifier drop resulting from the commutation overlap, rather than by the machine's thermal rating. Since the present invention eliminates commutation overlap, the mismatch between the machine's shorttime overload thermal capability and its rectified output is alleviated. In addition, since the capacitors can eliminate the commutation overlap, there is no need to employ damper windings for the purpose of keeping the machine's commutation reactance small. As a consequence, line commutated AC converter systems in accordance with the present invention can produce 25%–30% higher output per unit of equipment weight than can be achieved with conventional equipment, but with generators that are built without the extra cost of damper windings.

A number of favorable solutions to the basic problem of using an AC machine with line-commutation have been developed heretofore. Two particular examples of the use of an AC machine with a line-commutated inverter are disclosed in U.S. Pat. Nos. 4,445,081, entitled "Leading Power Factor Induction Motor Drive", of Kalman et al, and U.S. Pat. No. 4,476,424, entitled "Variable Speed Induction Motor Drive System", of Kalman, which are hereby incorporated by reference. A further solution to the problem of providing variable speed induction motor drive systems capable of operating with large induction motors of standard configuration is disclosed in U.S. patent application Ser. No. 520,093, entitled "Capacitor-Assisted Line Commutation for Induction Motor Drive", filed Aug. 4, 1983, of Kalman and Huggett, which application is assigned to the assignee of the present application and is hereby incorporated by reference.

In addition, numerous examples of related control circuits for variable speed AC machines may be found in the prior art. A typical example is the disclosure of Steigerwald in U.S. Pat. No. 4,039,926, entitled "Current Fed Inverter with Commutation Independent of Load Inductance". That disclosure involves a three phase bridge inverter providing rectangular wave currents to an inductive load and to capacitors which are connected in wye across the load for wave shaping as well as filtering and power factor correction. A force commutating capacitor connected to the midpoint of the wye-connected capacitors is controlled by two auxiliary thyristors. The force commutating capacitor voltage is sensed and an incoming thyristor is not fired until the voltage rises to a level sufficient to commutate the next thyristor in sequence, thereby providing forced commutation which is independent of load inductance. This force commutating capacitor, dual thyristor forms the switching circuit which acts to force commutate the bridge inverter. Although portions of the circuit of FIG. 1 of the Steigerwald patent appear superficially similar to figures depicting the invention herein, the circuit is force commutated and the wye-connected capacitors are provided for an entirely different purpose from the commutator capacitors incorporated in the present invention and no suggestion of the arrangement of the present invention and the beneficial results from the practice thereof has been found in the Steigerwald patent.

SUMMARY OF THE INVENTION

In brief, arrangements in accordance with the present invention provide a plurality of converters typically using diodes or thyristors as solid-state switches coupled to the output of a polyphase AC machine to provide line-commutation, and a plurality of capacitors coupled to the circuit connections between the converter and the AC machine output to provide an alternate current flow path, and allow instantaneous commutation, to thereby eliminate the necessity for a damper winding in the AC machine and to permit the use of a less costly, more efficient machine. Elimination of the commutation overlap raises the average output voltage and power of the circuit. The AC machine may be either a motor or a generator of the synchronous type.

As noted hereinabove, capacitor-assisted line commutated rotating machinery systems have been known heretofore. The present invention resides in the discovery that the use of line capacitors in association with line commutated control rectifiers provides a control of the line commutation process which improves the applicable electrical output waveform to the extent that the damper winding of prior art synchronous machines may be eliminated, while improving the efficiency of the system.

DESCRIPTION OF THE DRAWINGS

A better understanding of the present invention may be realized from a consideration of the following detailed description, taken in conjunction with the accompanying drawings, in which.

DESCRIPTION OF THE PREFERRED EMBODIMENT

Figure 1:
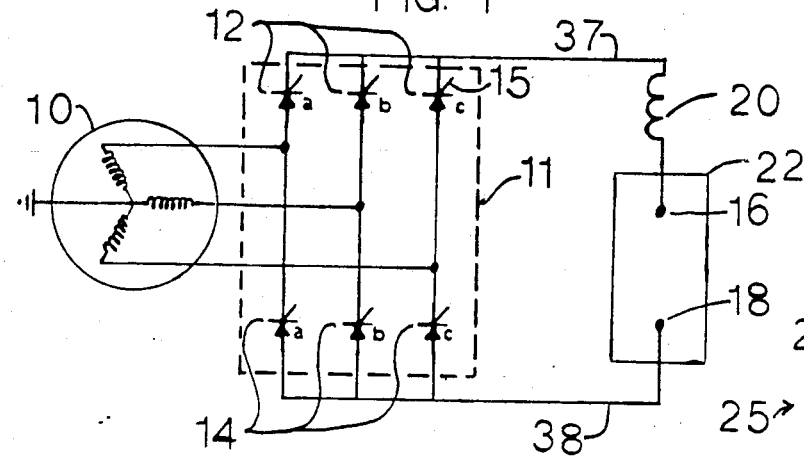
FIG. 1 is a schematic diagram of a conventional converter-fed AC machine, having a damper winding in its rotating member, operating in the rectifier mode.
Figure 2:
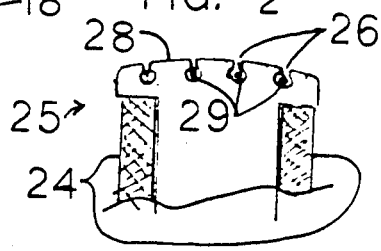
FIG. 2 is a schematic representation of a portion of the rotating member of the AC machine of FIG. 1.

A conventional converter-fed AC machine operating in conjunction with line-commutated rectifiers is shown in the schematic diagram of FIG. 1. In the depicted circuit, a three phase synchronous AC machine 10, acting as a generator, is shown coupled in conventional fashion to a rectifier 11, including a plurality of diodes or thyristors, 12 a,b,c and 14 a,b,c to generate a DC voltage between terminals 16 and 18. A smoothing inductance 20 is shown in series on one side of the line. The outline box 22 containing the terminals 16, 18 may be a DC link feeding other circuitry such as an inverter, for example, or it may represent a DC load, including a DC motor, for example. The AC machine 10 is of conventional design and includes at least one damper winding in its rotating member. The use of a damper winding in the AC machine 10 is represented in the salient pole portion depicted in FIG. 2, which shows part of the rotating member 25 of the AC machine 10, having a main excitation or field winding 24 and a plurality of slots 26 situated along the face of the pole 28 to contain the damper windings 29.

The diodes or thyristors 12 a,b,c, and 14 a,b,c of FIG. 1 are connected in conventional fashion. In case of thyristors, each individual thyristor has a control electrode 15 which receives control signals from auxiliary control circuitry (not shown) to determine the timing of the conduction states of the thyristors 12 a,b,c, and 14 a,b,c in order to accomplish the desired line commutation. Typical auxiliary gate control circuitry is illustrated in the aforementioned U.S. Pat. No. 4,476,424, for example.

In conventional synchronous machines, the damper windings 29 serve to counteract the effect of leakage flux which would exist were it not for the damper winding 29 (leakage flux results in sloped transition of waveform). In the case of self-starting synchronous motors, the damper winding is active only during the starting period and is designed to give the required starting and pull-in torque. In the case of a synchronous generator, the damper winding helps to stabilize the field flux against the distorting effects of sudden load fluctuations.

In the case of a conventional synchronous converter with damper windings 29 in the rotating member used in association with the line commutated rectifier 11, as in the circuit of FIG. 1, the damper windings 29 are effective in reducing the extent of commutation overlap and in damping undesirable current harmonics which otherwise would be circulating in the main field winding 24.

Figure 3:
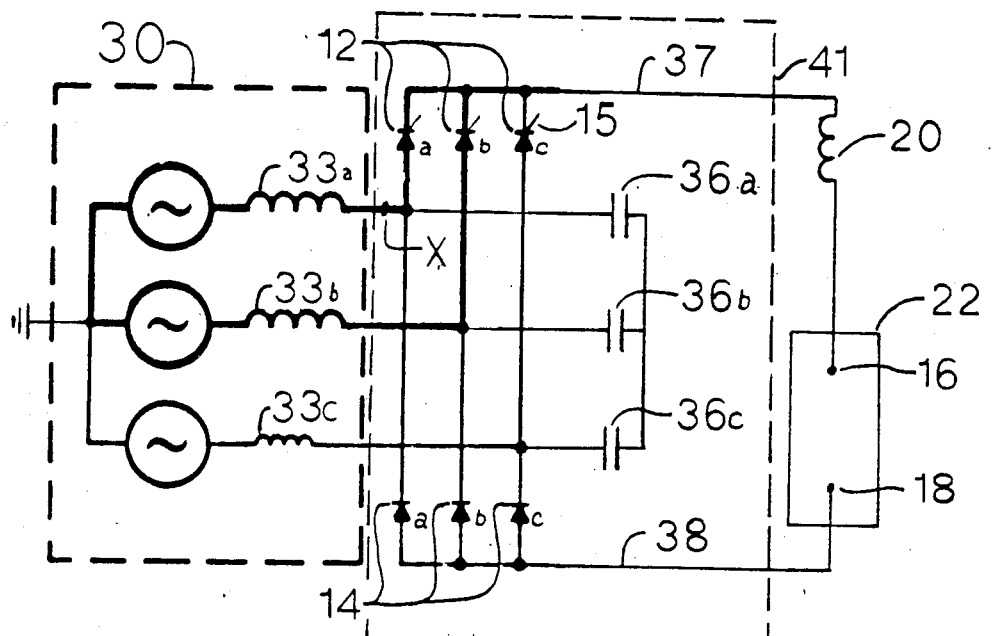
FIG. 3 is a schematic diagram of an machine without a damper winding, connected to circuitry in accordance with the present invention.
Figure 4:
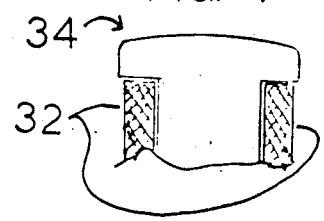
FIG. 4 is a schematic representation of a portion of the rotating member of the AC machine of FIG. 3, indicating the absence of damper windings in the rotating member.

The circuit of FIG. 3 is the same as the circuit of FIG. 1 with two exceptions: (1) the synchronous AC machine 30 has only a single winding 32 which is the main excitation or field winding and no damper winding on its rotating member, as illustrated in FIG. 4, and (2) the line commutating assist capacitors 36 are added across the output phase lines from the AC machine 30. These capacitors 36 are not provided for power factor correction or for filtering or for force commutation switching, as in similar systems of the prior arts, such as those of applicant Kalman's U.S. Pat. No. 4,445,081 and the Steigerwald U.S. Pat. No. 4,039,926 for example. Rather, these capacitors 36 are provided in conjunction with the single winding rotor AC machine 30 to assist in the line commutation within a capacitor-assisted rectifier circuit 41 in order that the need for a synchronous machine having a damper winding in the circuit of FIG. 3 is eliminated.

The AC machine 30 of FIG. 3 includes a rotor 34 (partially shown in FIG. 4), which may produce the magnetic flux either electromagnetically or with a permanent magnet, and a stator. The stator is made up of a plurality of output phase windings 33, in this instance three phase windings 33 a,b,c are shown. The phase windings 33 are formed from a conductor or stranded conductor, which is disposed within the stator forming a coiled winding. One end of the conductor forming each of the phase windings 33 is connected at a common point, while the opposite output end is connected to the rectifier circuit 41. The output end of phase winding 33a is connected to the anode of a diode or thyristor 12a, the cathode of diode or thyristor 14a, as well as to a first input to capacitor 36a. Similarly, the output end of winding 33b is connected to the anode of diode or thyristor 12b, the cathode of diode or thyristor 14b and to a first input to capacitor 36b. Also, the output end of winding 33c is connected to the anode of diode or thyristor 12c, the cathode of diode or thyristor 14c, as well as a first input to capacitor 36c. The second input to all of the capacitors 36 a,b,c are connected to one another in a wye-connected mode. An equivalent delta connections of the generator and/or capacitors also apply. Additionally, all of the cathodes for diodes or thyristors 12 a,b, and c are attached to a single wire 37 which goes to a first pole 16 of the DC link 22. An inductor 20 may be included within the single lead 37. Also, all of the anodes of diodes or thyristors 14 a,b, and c are connected to a second wire 38 and to a second pole 18 of the DC link 22, thus completing the electrical circuit when the DC link 22 is installed. It should be understood that a thyristor such as 12 or 14 is one type of controlled rectifier, and other types of controlled rectifiers are also applicable to this circuit.

In accordance with the present invention, the capacitors 36 of the circuit arrangement of FIG. 3 constitute the means by which the DC link or DC load 22 may be effectively driven from a synchronous generator devoid of damper windings. As an additional benefit, these capacitors 36 further constitute the means by which the AC machine voltage and current waveforms at the output of the AC machine 30, are forced to closely approximate a true sine/cosine wave.

Figure 6:
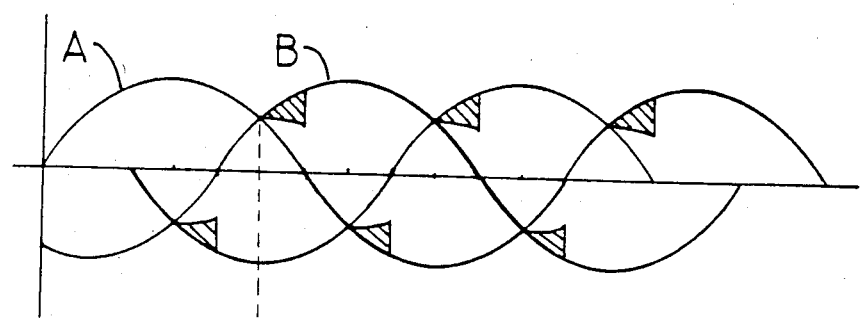
FIG. 6 is a waveform diagram illustrating the problem of waveform distortion resulting from commutation overlap in the circuit of FIG. 5.

The capacitors are effective in eliminating the commutation overlap problem of conventional circuits such as that shown in FIG. 1 and discussed with respect to the waveforms of FIG. 6. Since the inherent inductance within the phase winding 33a (for example) will not allow the AC current to rise or fall instantaneously, the capacitors 36 provide a current flow path for the current from phase winding 33a when the rectifier is commutated from diode or thyristor 12a to 12b. Similarly, the positive voltage produced within phase winding 33b prior to commutation to thyristor 12b also flows into the capacitors. The result is essentially instantaneous commutation of diode or thyristors 33a to 33b (or 33b to 33c or 33c to 33a) within the rectifier circuitry. Consequently, the momentary short-circuit between two of the generator output terminals which was previously encountered during line commutation is eliminated. Thus, for the converter system of FIG. 3 the internal impedance of the converted power supply is improved so that the DC level is more adequately maintained under increased load and temporary overload conditions.

This desirable result is achieved through the virtual elimination of commutation overlap, which derives from the use of the capacitors 36 and the judicious selection of the appropriate size of the capacitors in accordance with the voltage/current characteristic of the circuit. In the particular circuit shown in FIG. 3, the DC voltage at the terminals 16, 18 of a DC link 22 can be developed with a reasonably constant level over the range of load currents within the design limits of the circuit.

The following figures illustrate the nature of the problem of waveform distortion resulting from the line commutation of AC/DC converters using synchronous machines which are devoid of damper windings in the rotating member and the improvements which are realized from the practice of the present invention involving the use of capacitor-assisted line commutation.

Figure 5:
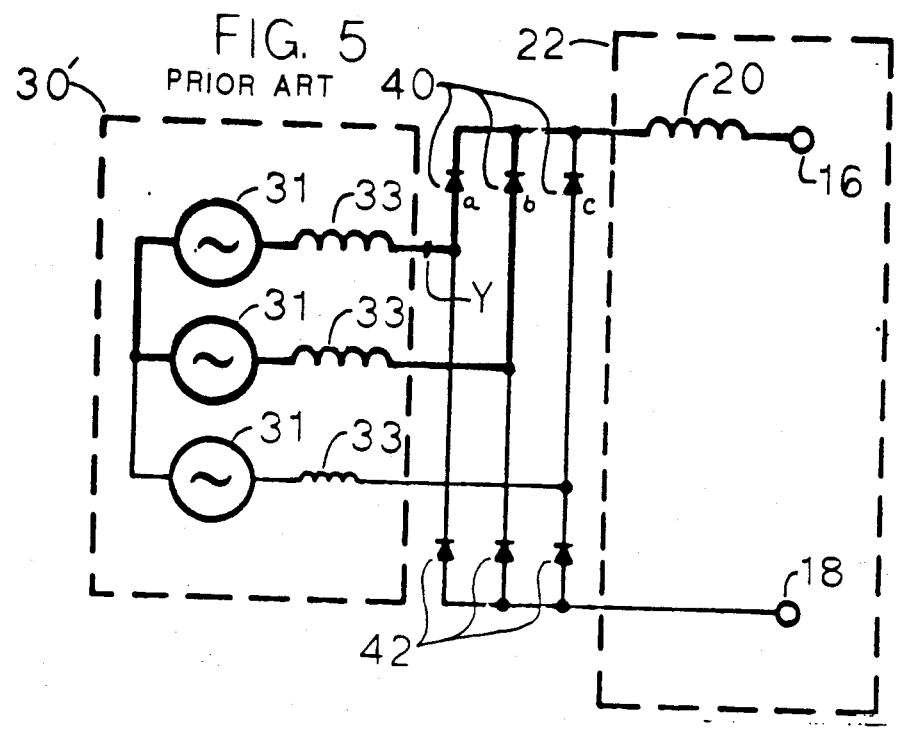
FIG. 5 is a schematic diagram of an equivalent electrical circuit of the arrangement of FIG. 1, wherein the damper winding has been removed from the rotating member.

FIG. 5 is a schematic diagram of the state of the art prior to the use of damper windings within the AC machine. The equivalent circuit of a synchronous AC machine 30', which is similar to the AC machine 30 of FIG. 3 in that it does not include a damper winding on the rotating member, is illustrated. This AC machine 30' is connected to phase rectifiers 40, 42 which provide line commutation. In conventional fashion, the three-phase AC machine 30' is shown having three individual alternators 31, one for each phase, as voltage sources in series with phase windings 33 for the respective phases. The alternators 31 may typically comprise permanent magnets mounted on the rotating member of the AC machine 30'. The individual rectifiers 40, 42, may be simple diode rectifiers as shown, or they may be understood to represent controlled rectifiers such as the thyristors 12, 14 of the circuit of FIG. 1. The remainder of the circuit is as previously shown, comprising a series inductance 20 and terminals 16, 18 within a DC link 22.

FIG. 6 shows the nature of the overlap problem within the circuitry of FIG. 5 resulting from the line commutating rectifiers 40, 42. In FIG. 6, the voltage waveform A represents the positive half-wave output of one of the individual phase windings in FIG. 5. The voltage waveform B represents the positive half-wave output of the next phase winding lagging the waveform A by 120°. As the waveform B increases in magnitude to where its value equals the instantaneous amplitude of waveform A, an overlap condition develops from the fact that diodes or thyristors 40a and 40b attached to two of the generator phases are conducting simultaneously thereby developing a partial short circuit. This overlap is not eliminated until voltage waveform A, associated with phase winding 33a, crosses through the zero point to switch off the diode or thyristor 40a. As a result of this overlap, indicated by the hatched portion of waveform B in FIG. 6, the voltage available at the terminals 16, 18 is equal to the combined envelope of voltage waveforms A and B minus the hatched overlap portion. FIG. 6 depicts the overlap for three adjacent waveforms. If this illustration is extended, however, it will be apparent the overlap occurs every 60° of the rotation of the rotating member for each of the two banks of rectifiers 40, 42.

Figure 7:
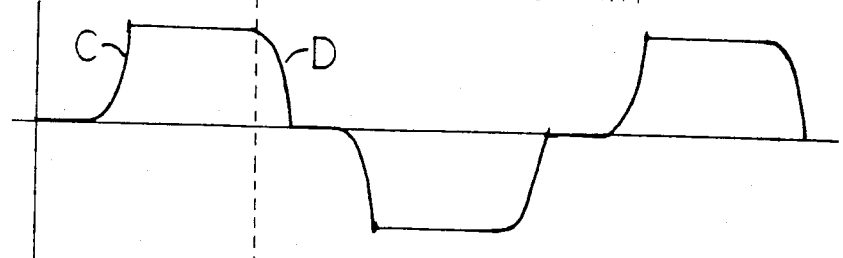
FIG. 7 is a waveform of current provided by one phase winding through an ideal filter for the circuit of FIG. 5.

FIG. 7 shows the result of the overlap effect on rectifier output current as contributed by one winding 33 for the circuit of FIG. 5 and assuming an ideally large inductance for the DC load 22. Although it is preferable for the thyristors to turn on and off substantially instantaneously and cleanly, as in FIG. 8, it is clear from FIG. 7 that the transition between on and off conditions for the thyristors of the circuit of FIG. 5 takes a significant period of time, relative to the period for a full cycle.

Figure 8:
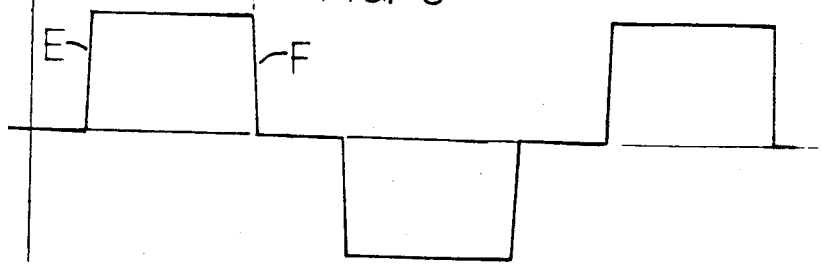
FIG. 8 is a corresponding waveform of current provided by one phase winding through an ideal filter for the circuit of FIG. 3.

By contrast with the waveform of FIG. 7, FIG. 8 illustrates the current output through switches 12 or 14 for a circuit including an ideally large inductance for the DC load 22 in accordance with the invention as shown in FIG. 3, for example. The transition intervals E and F in the waveform of FIG. 8 representing the turn-on and turn-off times, are substantially instantaneous in comparison to transition intervals C and D in FIG. 7. The reduction in transition intervals accounts for a 25%-30% increase in the dc output of the system.

Figure 9:
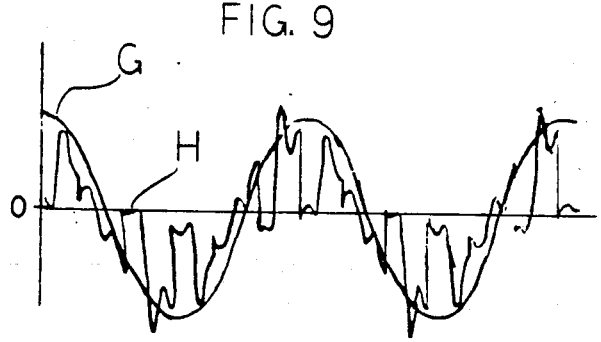
FIG. 9 shows a pair of superimposed waveforms providing a comparison between the line voltage across one phase line-to-neutral of a conventional line commutated circuit such as that shown in FIG. 5 and the line voltage across one phase line-to-neutral of a capacitor-assisted line commutated circuit arrangement in accordance with the present invention as shown in FIG. 3.
Figure 10:
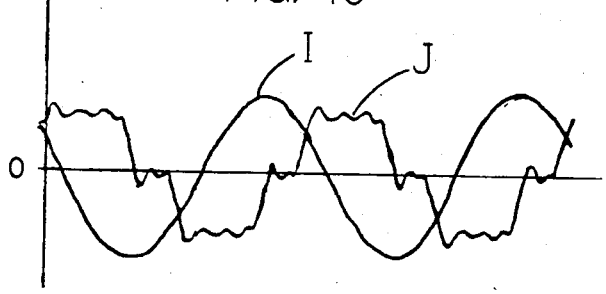
FIG. 10 shows a pair of superimposed waveforms comparing the line current waveforms for the circuits of FIGS. 3 and 5.

FIGS. 9 and 10 provide further evidence of the beneficial results which are achieved from the use of the capacitors 36 in conjunction with line commutating thyristors 12, 14 in the circuit of FIG. 3. FIG. 9 shows the two voltage waveforms, line-to-line, for two separate systems. Waveform G represents the line-to-line voltage between winding terminals 33a-33b for the capacitor-assisted line-commutation circuit of FIG. 3; waveform H represents the corresponding voltage waveform for the circuit of FIG. 5. As depicted in FIG. 9, the difference between the two waveforms is dramatic. Waveform G is very close to a pure sine/cosine waveform without the substantial harmonic content caused by commutation overlap short circuiting which is clearly present in waveform H.

FIG. 10 illustrates a similar improvement in the phase currents of the AC machine. Waveform I represents the phase current at point X in the circuit of FIG. 3, whereas waveform J represents the phase current at point Y in the circuit of FIG. 5. As with FIG. 9, the current waveform I for the circuit in accordance with the invention closely approximates a pure sine/cosine waveform, whereas the current waveform J of the circuit of FIG. 5 exhibits substantial harmonic content.

Figure 11:
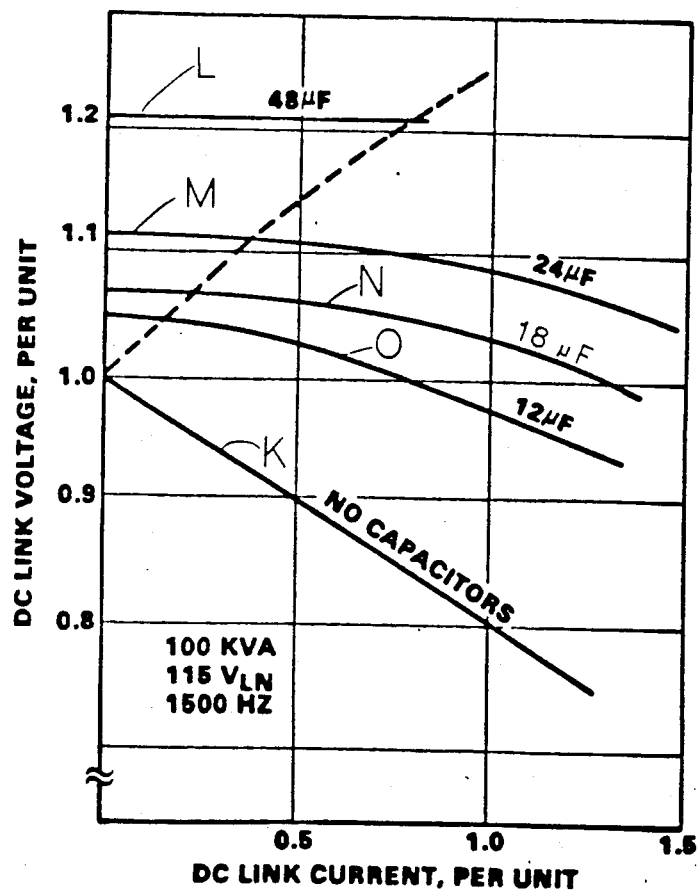
FIG. 11 is a graph of output voltage as a function of current, for the circuit of FIG. 5 and for the circuit of FIG. 3 including different values of capacitance for the commutation assist capacitors.

The plot of FIG. 11 also demonstrates the improvements in output voltage to be realized from the practice of the present invention. The plots of FIG. 11 show the results of tests conducted with a 100 KVA synchronous machine generating 115 volts, line-to-neutral, and operating at 1500 Hz, with and without capacitors for providing line commutation assistance. The results plotted in FIG. 11 have been normalized so that the DC link voltage and current are expressed in per unit values. The line K, being the plot of DC voltage versus current without use of capacitors in the line commutation circuit (FIG. 5) shows a substantial drooping characteristic for the DC output voltage as current is increased. The waveforms L, M, N and O are plots of DC voltage versus current for the system of FIG. 3, utilizing different values of capacitance in the circuit. For the particular system tested, capacitors 36 (see FIG. 3) having a value of 48 microfarads appear to be optimum, producing an essentially flat characteristic of voltage versus current, as shown by line L. Lesser values of capacitance result in a drooping characteristic, although in all of the cases depicted, utilizing capacitor-assisted line commutation, the result was better than could be obtained when no capacitors were used.

Tests conducted in the operation of the system of FIG. 3 with and without the capacitors 36 being connected as indicated demonstrate that the system exhibits improved performance with the capacitors connected in the circuit. In one particular coast-down test with measurements taken at a test point of 1430 Hz, measurements of specific power output showed that the capacitor-assisted line commutation system developed approximately one-third more power (82 KW versus 61 KW) than the same line commutation system without the capacitors connected. Since the same machine was being tested with and without the capacitors installed, the weight of the two systems differed by the weight of the capacitors, approximately three pounds. The specific power output, however, was significantly greater for the capacitor assisted system, being 1.35 KW/lb. as against 1.05 KW/lb. for the conventional system without capacitors. In this test, the value of each capacitor was 17 microfarads (delta connected).

These tests conducted in the running of systems such as are shown and described herein under comparable conditions for line commutated AC/DC converters with and without the assistance of commutating capacitors show that systems in accordance with the present invention operate at higher output current and power levels with reduced losses in the machine, particularly with respect to the internal copper losses, and run at less elevated machine winding temperatures.

In summary, the practice of the present invention in circuits of the type disclosed and described herein achieves the benefits of increased generator specific power output (kilowatts per pound), reduced generator losses, reduced generator harmonic content, and also present the capability of matching short-term overload capability of the generator to the solid-state converter.

Although there have been described above specific arrangements of a converter-fed AC machine without damper winding in accordance with the invention for the purpose of illustrating the manner in which the invention may be used to advantage, it will be appreciated that the invention is not limited thereto. For example, the electrical power converter apparatus of the present invention can also be operated in reverse, i.e. with a DC generator, applying power to the terminals 16 and 18, driving a polyphase AC motor. When operating in this mode, the rectifier assembly acts to rectify and commutate DC voltage and thereby selectively energize the phase windings of the AC motor. Accordingly, any and all modifications, variations or equivalent arrangements which may occur to those skilled in the art should be considered to be within the scope of the invention as defined in the annexed claims.

What is claimed is:

1. An electrical power converting apparatus to be used in association with an AC generator or the like including a salient pole rotor devoid of damper windings and a stator having a plurality of phase windings, said apparatus comprising:
    a plurality of line commutating rectifiers coupled to said phase windings of said AC generator for developing a direct current output by the rectification of the output voltage produced within said plurality of phase windings of said AC generator; and
    means for causing instantaneous commutation between said line commutating rectifiers effectively eliminating waveform overlap.

2. The apparatus of claim 1 wherein said rectifiers are interconnected in a bridge rectifier circuit.

3. The apparatus of claim 2 wherein said rectifiers are controlled rectifiers.

4. The apparatus of claim 2 wherein said rectifiers are thyristors.

5. The apparatus of claim 1 wherein said means for causing instantaneous commutation comprises an equal plurality of capacitors respectively connected to said plurality of phase windings of said AC generator.

6. The apparatus of claim 5 wherein the values of capacitance of said plurality of capacitors is selected to maintain a substantially constant level of output DC voltage over a predetermined range of variable output current.

7. An electric power generating and converting apparatus comprising:
    a polyphase AC generator having a salient pole rotor and a stator including a plurality of phase windings;
    a DC load source requiring a DC input;
    rectifier means interconnecting the output from said polyphase AC generator and said DC load source, for causing the rectification of and instantaneous commutation between the AC ouput from each of said plurality of phase windings of said AC generator.

8. The apparatus of claim 7 wherein the rectifier means comprises:
    a plurality of converters interconnected to said plurality of phase windings in a polyphase bridge configuration; and
    a plurality of capacitors coupled to the circuit connections between said converters and said phase windings, said capacitors providing an alternate current flow path during the commutation of said converters.

9. The apparatus of claim 8 wherein the converters are thyristors.

10. The apparatus of claim 8 wherein the converters are diodes.

11. The apparatus of claim 8 wherein the capacitors are themselves interconnected at a common point on the side of said capacitors remote from the connections to the respective phase windings.

12. The apparatus of claim 7 wherein the rectifier means converts substantially all of the output generated within the polyphase AC generator without dissipation within the A.C. generator itself.

13. The apparatus of claim 7 wherein the AC generator is capable of driving a load which is 150% higher than the rated load of the generator for a short interval of time.

14. An electrical power generating and converting apparatus comprising:
    a polyphase AC generator having a rotatively driven rotor and a stator including a plurality of phase windings;
    a DC load having a first and second pole connection;
    a plurality of rectifier pairs, each pair connected to each of said plurality of phase windings such that a first rectifier of said rectifier pair is connected at its anode and a second rectifier of said rectifier pair is connected at its cathode to one of said phase windings, all of said first rectifiers having their cathodes connected together and also connected to said first pole of said DC load, and all of said second rectifiers having their anodes connected together and also connected to said second pole of said DC load; and
    a plurality of capacitors, equal to said plurality of phase windings and having one side of each of said capacitors connected to the point of connection between said phase winding and said rectifier pairs, the other side of each of said capacitors being connected together, said capacitors providing assistance in the commutation of the rectifiers during rectification of the AC output from said AC generator into a DC voltage applied to said DC load between said first and second pole connections.

15. An electrical power converting apparatus comprising:

a DC generator means;

a polyphase AC motor having a salient pole rotor including a main field winding and a stator including a plurality of phase windings;

rectifier means for interconnecting the output from said DC generator means to said AC motor, said rectifier means providing rectification and commutation of the DC voltage provided by said DC generating means into a sequential output applied to said phase windings of said AC motor to drive said AC motor.

16. A method of generating and converting electrical power comprising the steps of:

driving a salient pole rotor of a polyphase AC generator to induce a sinusoidally varying voltage within a plurality of phase windings of said polyphase AC generator;

instantaneously commutating successive phase windings into electrical connection with a DC load through a plurality of line commutating rectifiers; and eliminating commutation overlap between successive phase windings during said instantaneous commutation thereof.

17. The method of claim 16 wherein the instantaneously commutating step further comprises:

providing an alternate current path through capacitors connected to each of the phase windings during the interval between when one of the phase windings output voltage begins to be positive and when the same phase winding is commutated into electrical connection with said DC load.

18. The method of claim 16 wherein the instantaneously commutating step further comprises:

providing an alternate current path through capacitors connected to each of the phase windings for the current produced within the phase winding during the interval between when the phase winding is commutated out of electrical connection with the DC load and when the voltage produced by the same phase winding is zero.

19. The method of claim 17 further including the step of preselecting the value of capacitance of said capacitors to provide an essentially constant level of DC output voltage over a predetermined range of output current.

20. The method of claim 19 further including the steps of selecting the values of capacitance to be the same for all of said capacitors.

* * * * *